May 12, 1970 — J. H. RENTSCHLER — 3,511,685

METHOD OF MAKING SEALING RINGS

Original Filed March 10, 1964

INVENTOR.
JOHN H. RENTSCHLER
BY Schroeder, Siegfried
& Ryan
ATTORNEYS

United States Patent Office 3,511,685
Patented May 12, 1970

3,511,685
METHOD OF MAKING SEALING RINGS
John H. Rentschler, Minneapolis, Minn., assignor to Minnesota Rubber Company, Minneapolis, Minn., a corporation of Minnesota
Continuation of application Ser. No. 604,055, Dec. 22, 1966, which is a division of application Ser. No. 350,747, Mar. 10, 1964, now Patent No. 3,322,433. This application Jan. 30, 1968, Ser. No. 701,790
Int. Cl. B44d 1/14, 1/22; B32b 25/08
U.S. Cl. 117—47                              12 Claims

ABSTRACT OF THE DISCLOSURE

A method of making a sealing ring consisting in bonding directly to an all elastomeric ring a very thin film of less than three mils of a prepolymer polyurethane resin dissolved in a suitable solvent and permitting the same to dry in moist air, the resin in the preferred form having a quantity of an anti-friction filler of ten to twenty percent by volume contained therein. If a coating in excess of three mils thickness is required, it must be applied in individual laminates, each of which has a thickness of no more than three mils and must be permitted to dry separately in most air.

---

This application is a continuation of application Ser. No. 604,055, filed Dec. 22, 1966, now abandoned, which, in turn was a division of application Ser. No. 350,747, filed Mar. 10, 1964, now U.S. Patent No. 3,322,433.

The present invention is directed to a composite sealing ring, such as an O-ring structure, and the method of making same. More particularly, it is directed to a sealing ring formed of a solid elastomer having as a bonded coating therefor, a plurality of thin separately cured laminations of polyurethane upon the working face thereof. Even more specifically, it relates in its more limited form to a sealing ring having a bonded coating on its working face comprised of a plurality of separately cured laminations of a mixture of polyurethane and a friction reducing filler composition.

Sealing rings, and particularly O-rings, have been utilized for sealing purposes for many years and have been formed of a wide variety of materials. These include rubbers, both natural and synthetic—including polyurethanes —and also from non-elastomeric materials such as polytetrafluoroethylene. Each of these possesses some particular quality that makes its use desirable, but each also possesses limitations that lessens its field of application. Natural rubbers and most synthetic rubbers have the necessary flexibility to permit low pressure sealing when used as O-rings, but the wear qualities are inferior to elastomers such as polyurethane. Polyurethane elastomers have the desired wear characteristics, but are so non-resilient in character as to require relatively high pressure engagement to insure sealing. Polytetrafluoroethylene and related plastics such as polychlorotrifluoroethylene have excellent low friction characteristics and are chemically inert, but are both expensive and because of their non-resilient nature, require high pressure engagement to effect sealing.

I have found that it is possible to incorporate the desirable features of each of the aforementioned classes of materials within a single sealing ring without incorporating their disadvantages. This is done in accordance with my invention by forming a composite structure comprised of a core and a plurality of very thin laminations bonded to the working face thereof. The main body of the structure is a highly resilient solid elastomer; silicone rubbers and fluoro-elastomers are specifically excluded. Over the sealing or working surface of the base structure of the preferred embodiment of the invention there is bonded a plurality of separately cured very thin films of polyurethane having included therein, as a filler material, an antifriction material such as graphite or tetrafluoroethylene. I have found that such a sealing ring seals equally as well as a ring made solely of the conventional materials from which the base structure is formed, that it at least doubles the wear-life of the ring, and that it has a substantially lower coefficient of friction and hence is more desirable.

Consequently it is a general object of my invention to provide a novel and improved sealing ring as an article of manufacture which is simple and inexpensive to manufacture and functions in a highly improved manner.

A more specific object is to provide a novel and improved sealing ring as an article of manufacture which has approximately double wear-life and substantially reduced friction characteristics and can be manufactured simply, easily, and inexpensively.

Another important object is to provide a novel, simple, and inexpensive method of producing a new article of manufacture in the form of a sealing ring having substantially improved wear-life and anti-friction characteristics.

Another object is to provide a novel and improved article of manufacture in the form of a sealing ring comprised of a conventional solid elastomeric sealing ring, exclusive of silicone rubber, fluoro-elastomers, and polyurethane, rubber having a Shore Durometer test of less than 40 or higher than 90, with a plurality of separately cured very thin laminations of polyurethane bonded on its working or sealing face and having improved wearing qualities and reduced friction qualities.

Another object is to provide a novel, simple, inexpensive and improved method of producing a new article of manufacture in the form of a sealing ring whereby a sealing coating having greatly improved wearing qualities may be bonded to the working face of the ring more effectively than heretofore known and whereby a friction reducing filler may be included in the coating without weakening the bond.

Another object is to provide a novel and improved article of manufacture in the form of a sealing ring which is simple, and inexpensive to produce and is characterized by a vulcanized solid elastomeric core with a plurality of very thin laminated coatings bonded in a superior manner on its working face and having as a filler therein a compound having a very low coefficient of friction whereby the coating has significantly lower friction qualities.

These and other objects and advantages of this invention will more fully appear from the following description, made in connection with the accompanying drawings, wherein like reference characters refer to the same or similar parts throughout the several views, and in which.

Figure 3:
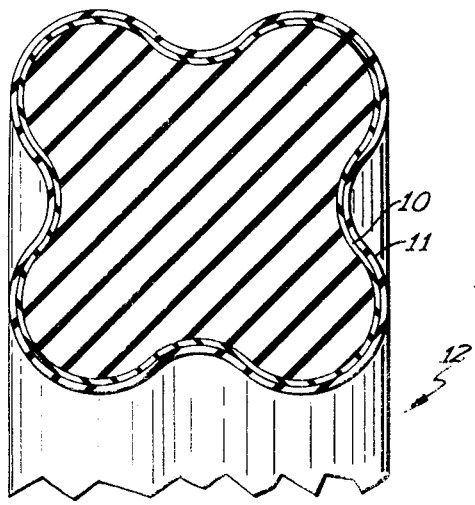
Figure 4:
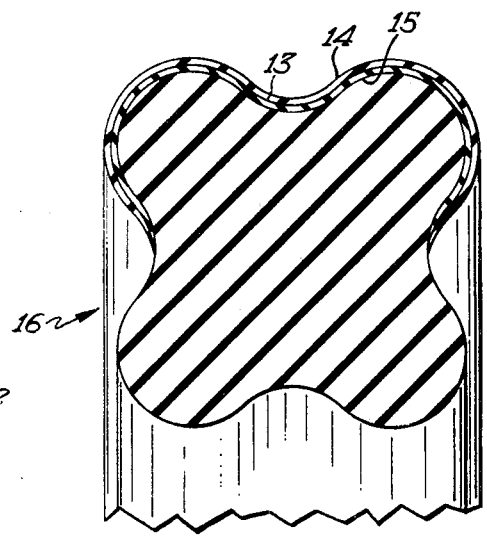

FIG. 3 is a cross-sectional view of a sealing ring of another cross-sectional configuration and embodying my invention with the individual laminations of the laminated sheath of polyurethane shown in exaggerated proportional dimensions relative to the solid elastomeric core to better illustrate its construction; and FIG. 4 is a cross-sectional view of the same cross-sectional configuration as that shown in FIG. 3 and embodying my invention with only its working faces coated with polyurethane and the individual laminations of the coating shown in exaggerated proportional dimensions relative to the solid elastomeric core to better illustrate its construction.

The invention will be described with respect to the use of a nitrile or neoprene rubber base stock which are preferred for the core although it should be recognized that the invention is equally applicable to other solid elastomers such as the natural rubbers, butyl rubbers and ethylene propylene rubbers, but excluding the previously noted silicone rubbers and fluoro-elastomers. In addition, most polyurethane rubber base stock (as noted hereinbefore) does not possess sufficient resiliency to function as a core for a relatively low pressure seal and would accordingly not be suitable for use in employing my invention since it does not possess the desirable low pressure sealing capability, although the desirable low friction characteristics of the material would be present.

In practice, the rubber base stock is molded into the desired configuration and vulcanized to a finished state as is conventional in the manufacture of O-rings or similar sealing rings of different cross-sectional configuration. The ring is then cleaned in a strong detergent and water solution to remove the mold release material from its surface and the surface is then chlorinated. The chlorination step is not mandatory although markedly improved adhesion results from its use. Chlorination is readily accomplished by immersing the ring for 3–5 minutes in a solution of sodium hypochlorite (1–5%) acidified with hydrochloric acid (pH 1–2).

To prepare the coating material, a polyurethane resin is formulated by reacting a diisocyanate with a polyol to form a resin having a molecular weight of from about 500 to 1500 between isocyanate terminated cross-linking sites. The preferred formulation is as follows:

| | Moles |
|---|---|
| Polypropylene glycol (average molecular weight 100) | 1 |
| 1-3-butanediol | 1 |
| Trimethylol propane | 1 |
| Toluene diisocyanate | 6 |

The above mixture is then reacted to form a resin in the absence of water. These materials, when freshly mixed, react exothermically. For the first hour, upon mixing, I cool the mixture sufficiently so as to maintain its batch temperature below 90° F. At the end of one hour, I raise the batch temperature by heating to 175° F. and maintain this temperature for about seven hours. At this point the prepolymer is ready for application to the base rubber rings.

Following the reaction the product is dissolved in a suitable solvent such as 1:1 mixture of xylene and cellosolve acetate and a quantity of finely powdered (−325 mesh) anti-friction agent is blended into the solvent-resin mixture. Various anti-friction materials can be used including molybdenum disulphide, graphite, and highly fluorinated ethylene propylene, chlorotrifluoroethylene, and the like. I have found that the use of polytetrafluoroethylene in from 10–20 parts per hundred by volume produces a final product having the best all around properties of good wear, adherence, and low friction. Various amounts of the anti-friction filler may be used, dependent on the requirements of the final product. However, above 25% by volume of tetrafluoroethylene in the solvent free mixture is considered undesirable because it will result in diminished cohesion of the final film. Higher concentrations—up to about 40 parts per hundred—of graphite or molybdenum disulfide can be used. However, the friction reducing characteristics are not as great for these materials as they are for polytetrafluoroethylene in equivalent amounts.

Figure 1:
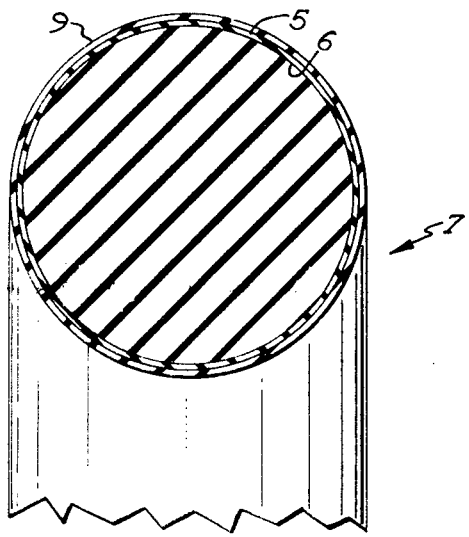
FIG. 1 is a cross-sectional view of an O-ring embodying my invention with the individual laminations of the laminated sheath shown in exaggerated proportional dimensions relative to the solid elastomeric core to better illustrate its construction.
Figure 2:
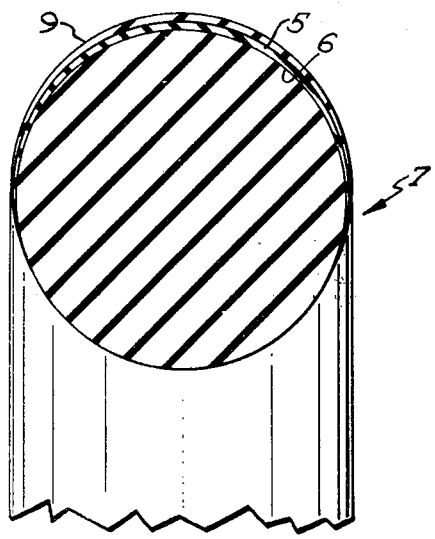
FIG. 2 is a cross-sectional view of an O-ring embodying my invention with only its working face coated with polyurethane and the individual laminations of the coating shown in exaggerated proportional dimensions relative to the solid elastomeric core to better illustrate its construction.

The method of applying the polyurethane or polyurethane-anti-friction composition determines the quantity of solvent necessary. Dip coating is permissible, although spray coating of the base rubber ring is preferred. For spray coating 1:1 solvent to resin is suitable although more solvent is preferable. It is imperative that the dissolved polyurethane be applied, as illustrated in FIGS. 1–2, in a sufficiently thin layer 5 to the working face 6 of the base rubber ring indicated generally as 7 so that upon drying and curing, the film or laminate of polyurethane for any particular application shall not exceed 3 mils. A preferred thickness of the film is 1–3 mils although a thickness as low as 0.5 mil will provide definite advantages over a non-coated ring. Thereafter it is permitted to dry and cure through reaction with the moisture of the air. I have found that this curing action of the very thin film specified produces a bond of unexpected strength which will prevent peeling of the coating while under severe strain. Moreover such a sealing ring has wearing qualities which approximate twice the wearing quality of such a ring without such a coating on the wearing face and it provides only approximately one-tenth (or less) as much friction when it is moved relative to the face of an element against which it bears and upon which the seal is to be perfected.

Final curing of the laminate of the coated ring working face, following evaporation of the solvent, takes place upon exposure to the air at ordinary humidities. This vulcanization takes place in the known way with evolution of carbon dioxide. The reaction can be accelerated by exposure to elevated humidity and/or by use of accelerators such as amines.

When thicknesses of the polyurethane coating greater than 3 mils are desired, the coating must be applied and cured successively in multiple layers not exceeding 3 mils each. This has been illustrated in FIGS. 1–2 wherein the second layer of film, applied after lamination 5 has cured, has been identified by the numeral 9. In no event, however, may the aggregate thickness of the laminations exceed 10 mils if adequate sealing qualities are to be maintained.

When films in excess of 3 mils are to be produced on the base rubber, separate laminations must be cured individually by exposure to the moist air before application of subsequent films. This is necessary to produce proper bonding of the first lamination to the base rubber and of subsequent laminations to each other and insures that the evolution of $CO_2$ brought about during curing does not cause bubbles to appear in the final film.

I have also found that if my invention is practiced as described above, even without the inclusion of the anti-friction material as a filler, the resultant sealing ring with its laminations of polyurethane on its working face, has substantially improved wear qualities and reduced friction qualities, as compared to a conventional elastomer sealing ring, although these qualities are not improved to the same extent as when the filler is used as described.

The article of manufacture resulting from coating the base rubber stock in the manner as first described above has markedly improved wear resistance over that of uncoated articles. The friction characteristics are likewise reduced to approach that of pure polytetrafluoroethylene.

A relatively wide range of composition is permissable in formulating the polyurethane resin coating material. Almost any polyfunctional hydrixy compound when formulated with a polyisocyanate will serve as a resin to produce a coated rubber base product possessing the improved characteristics of the present invention when applied as herein described.

Polyethylene and polybutylene glycols or polyesters may be used as diols in place of polypropylene glycols. Other suitable diols include pentanediol, dihydroxy castor oil derivatives and neopentyl glycol. Trimethylol ethane, castor oil, hexanetriol, and polyoxy propylene adducts of either hexane triol or glycerine may be used as trifunctional cross linking molecules. Aliphatic diols and triols having a carbon chain of 8 atoms or below are satisfactory. Above this the reactivity and properties of the product are less desirable.

The diisocyanate compound should be an aromatic based compound rather than the less reactive aliphatics.

In the compounding of the formulation to be used in coating of the base rubber sealing ring, variations of the preferred formulation may be used. However, to achieve the benefits of the invention, the molecular weight of the prepolymer resin should be maintained within the 500–1500 figure. Thus selection of the diisocyanate and reactive hydroxyl group compounds should be made with this goal in mind.

It will be noted that in FIGS. 3–4 I have illustrated an application of my invention to a base rubber stock of a different cross-sectional configuration. In FIG. 3 the coating or sheath is comprised of a pair of laminates 10 and 11 which envelope the solid elastomeric ring 12. In FIG. 4 the laminates 13 and 14 of the coating are applied to the sealing or working face 15 of the ring 16.

Wherever herein the term "organic carbon chain solid elastomeric material" or the equivalent thereof is used it is intended to include all natural and synthetic rubbers with the exception of those polyurethanes indicated hereinbefore as having insufficient resiliency to function similar to the other natural and synthetic rubbers and is intended to exclude the silicone rubbers and fluoroelastomers.

It should be noted that the sealing rings produced in accordance with my invention are designed primarily for use at relatively low pressure levels although they will function and provide their advantages up to pressures in the area of as much as 3000 p.s.i.

Thus it can be seen that I have provided a novel methor of forming a new and improved article of manufacture which can be produced very inexpensively and has substantially improved desirable wearing qualities and reduced friction characteristics. Moreover, the advantages of my invention are readily attainable, easily and safely handled, and relatively inexpensive.

It will, of course, be understood that various changes may be made in the form, details, arrangement and proportions of the parts without departing from the scope of this invention which consists of the matter shown and described herein and set forth in the appended claims:

What is claimed is:

1. The method of producing a low friction, low pressure-sealable, wear resistant highly resilient sealing ring comprising:
    (a) forming a vulcanized sealing ring member of highly resilient nitrile base rubber,
    (b) treating the surface of the base ring in a solution of 1–5% by weight of sodium hypochlorite having a pH of 1 to 2 adjusted by the addition of hydrochloric acid,
    (c) preparing a prepolymer consisting essentially of polyurethane resin of a molecular weight of from 500 to 1500 resulting from the reaction of an aromatic diisocyanate and a polyhydroxy aliphatic compound having a carbon chain of less than 9, said prepolymer having dispersed therein an anti-friction agent from about 10 to about 20 parts by volume of polytetrafluoroethylene of −325 mesh,
    (d) spray coating said prepolymer-anti-friction agent onto at least the working surface of said ring in an ultimate thickness of less than 3 mils, and
    (e) exposing said coated ring to moist air for a period sufficient to cure said prepolymer.

2. The method of producing a low friction, low pressure-sealable, wear resistant highly resilient sealing ring comprising:
    (a) selecting a vulcanized sealing ring member formed of highly resilient nitrile base rubber and having a desired predetermined cross-sectional configuration,
    (b) treating the surface of the base ring in a solution of 1–5% by weight of sodium hypochlorite having a pH of 1 to 2 adjusted by the addition of hydrochloric acid,
    (c) spray coating an uncured prepolymer consisting essentially of polyurethane resin of a molecular weight of from 500 to 1500 resulting from the reaction of an aromatic diisocyanate and a polyhydroxy aliphatic compound having a carbon chain of less than 9, said prepolymer having dispersed therein an anti-friction agent from about 10 to about 20 parts by volume of polytetrafluoroethylene of about −325 mesh onto at least the working surface of said ring in an ultimate thickness of from 0.5 mil to 10 mils, said uncured coating not exceeding 3 mils in thickness at any time before curing, and
    (d) then exposing said ring when so coated to moist air for a period sufficient to cure said prepolymer.

3. The method of producing a highly resilient low friction, low pressure-sealable, wear resistant sealing ring comprising:
    (a) selecting a vulcanized sealing ring member formed of highly resilient nitrile base rubber and having a desired predetermined cross-sectional configuration,
    (b) chlorinating the surface of the base ring,
    (c) spray coating an uncured prepolymer consisting essentially of polyurethane resin of a molecular weight of from 500 to 1500 resulting from the reaction of an aromatic diisocyanate and a polyhydroxy aliphatic compound having a carbon chain of less than 9, said prepolymer having dispersed therein an anti-friction agent from about 10 to about 20 parts by volume of polytetrafluoroethylene of about −325 mesh, onto at least the working surface of said ring in an ultimate thickness of from 0.5 mil to 10 mils, said uncured coating not to exceed 3 mils in thickness at any time before curing, and
    (d) exposing said ring when so coated to moist air for a period sufficient to cure said prepolymer.

4. The method of producing a resilient wear-resistant sealing ring designed for sealing at low pressures consisting in:
    (a) selecting a vulcanized base sealing ring member formed of nitrile rubber and having a desired predetermined cross-sectional configuration,
    (b) treating the surface of the nitrile rubber base ring in a solution of 1–5% by weight of sodium hypochlorite having a pH of from 1 to 2 adjusted by the addition of hydrochloric acid,
    (c) preparing a prepolymer resin by mixing 6 moles of toluene diisocyanate with one mole of trimethylol propane, one mole of 1–3 butanediol, and one mole of polypropylene glycol having an average molecular weight of 100,
    (d) cooling said mixture for one hour sufficiently to maintain its batch temperature below 90° F.,
    (e) then heating said mixture sufficiently to raise its batch temperature to 175° F. and maintaining said mixture at that temperature for about seven hours,
    (f) dispersing within said mixture from about 10 to about 20 parts by volume of polytetrafluoroethylene of about −325 mesh,
    (g) applying directly to said base ring surface a single coating of said mixture dissolved in a suitable solvent, said coating having a thickness of less than 3 mils, and
    (h) exposing said coating to moist air for a period sufficient to cure said prepolymer.

5. The method of producing a highly resilient low friction, low-pressure sealable, wear resistant sealing ring comprising:
    (a) selecting a vulcanized sealing ring base member having a desired predetermined cross-sectional configuration and being formed of a highly resilient fluorine-free carbon chain solid elastomer having a Shore Durometer of from about 40 up to about 90,
(b) applying a coating of less than 3 mils in thickness of a prepolymer consisting essentially of polyurethane resin of a molecular weight of from about 500 to about 1500 to said base member, and
(c) then curing the coating by exposure thereof to moist air.

6. The method in accordance with claim 5 wherein a quantity of anti-friction filler material of up to 25 parts by volume is dispersed in said prepolymer.

7. The method in accordance with claim 6 wherein the anti-friction filler material is polytetrafluoroethylene of −325 mesh.

8. The method in accordance with claim 7 wherein the prepolymer is dissolved in a suitable solvent and spray-coated onto said base ring.

9. The method in accordance with claim 6 wherein the base ring is neoprene and the prepolymer is the reaction product of an aromatic diisocyanate and a polyhydroxy aliphatic compound having a carbon chain of less than 9.

10. The method in accordance with claim 5 wherein the base member is nitrile rubber and the prepolymer has dispersed therein from 10 to 20 parts by volume of an anti-friction agent.

11. The method defined in claim 5 and
(d) applying an additional coating of a prepolymer consisting essentially of polyurethane resin of a molecular weight of from about 500 to 1500 to the exterior surface of said cured first-mentioned coating, said additional coating not exceeding 3 mils in thickness, and
(e) then curing said additional coating by exposure thereof to moist air.

12. The method of producing a highly resilient low friction, low-pressure sealable, wear resistant sealing ring comprising:
(a) selecting a vulcanized sealing ring base member having a desired predetermined cross-sectional configuration and being formed of a highly resilient fluorine-free carbon chain solid elastomer having a Short Durometer of from about 40 up to about 90,
(b) spray coating an uncured prepolymer consisting essentially of polyurethane resin of a molecular weight of from about 500 to about 1500 onto at least the working surface of said ring to form a coating thereon having an ultimate thickness of 0.5 mil to 10 mils, the uncured prepolymer of said coating not to exceed 3 mils in thickness at any time before curing and then
(c) exposing said ring when so sprayed to moist air for a period sufficient to cure the uncured polymer.

References Cited

UNITED STATES PATENTS

| | | |
|---|---|---|
| 3,344,064 | 9/1967 | Brady et al. |
| 3,376,266 | 4/1968 | Hoegger et al. |
| 3,378,531 | 4/1968 | Heins et al. |

WILLIAM D. MARTIN, Primary Examiner

R. HUSACK, Assistant Examiner

U.S. Cl. X.R.

117—62.2, 138.8, 139, 161; 277—228